United States Patent Office 3,148,001
Patented Sept. 8, 1964

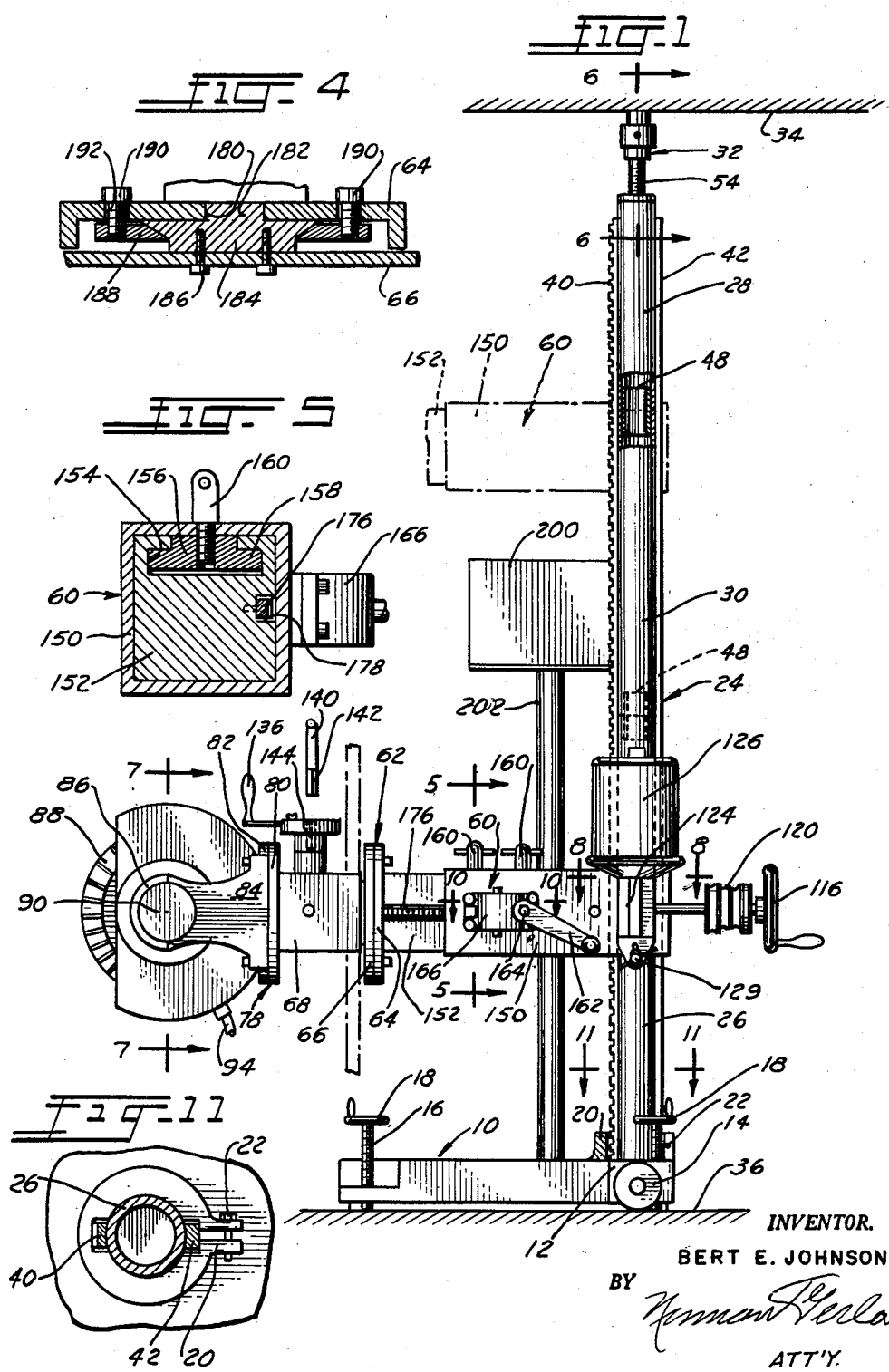

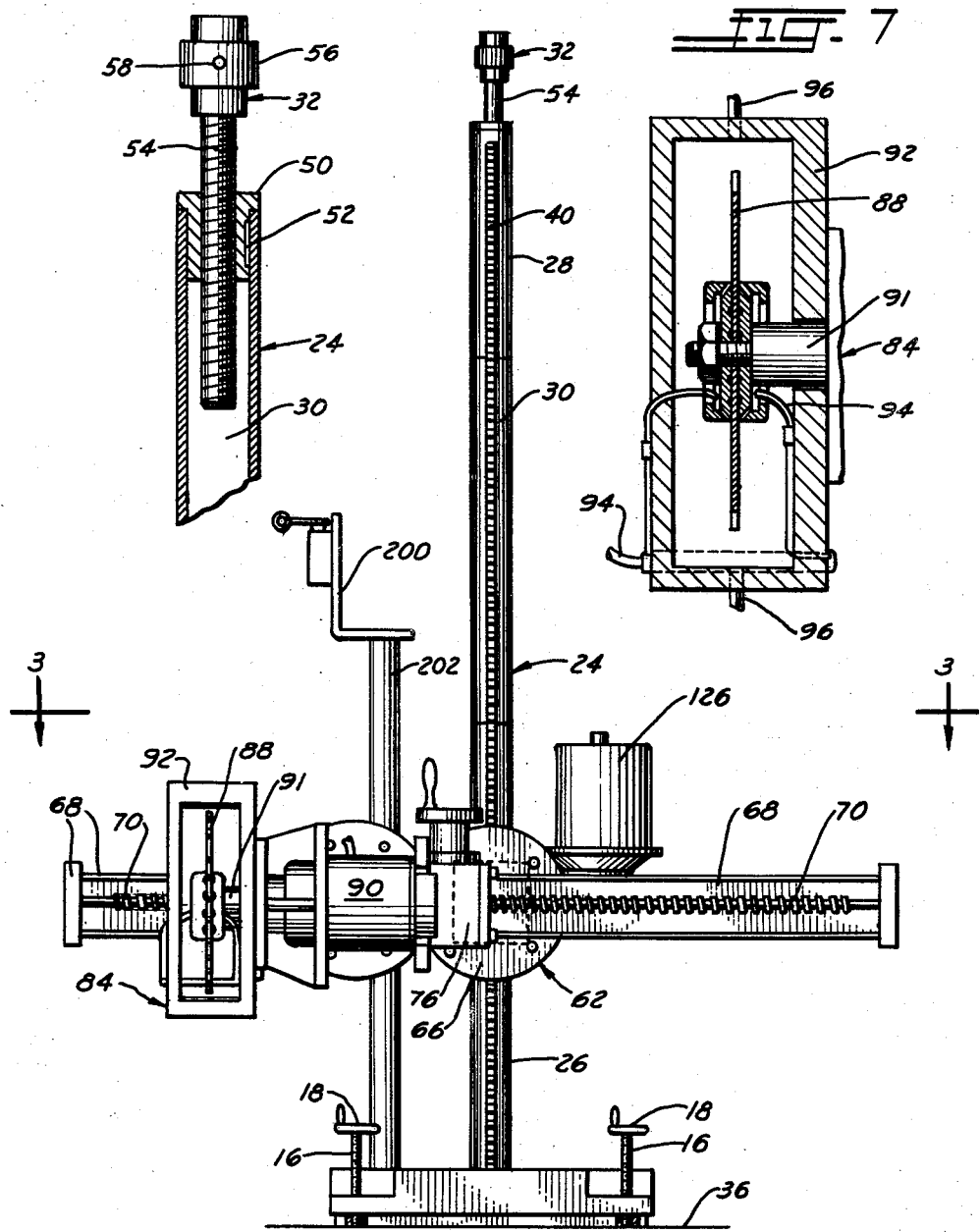

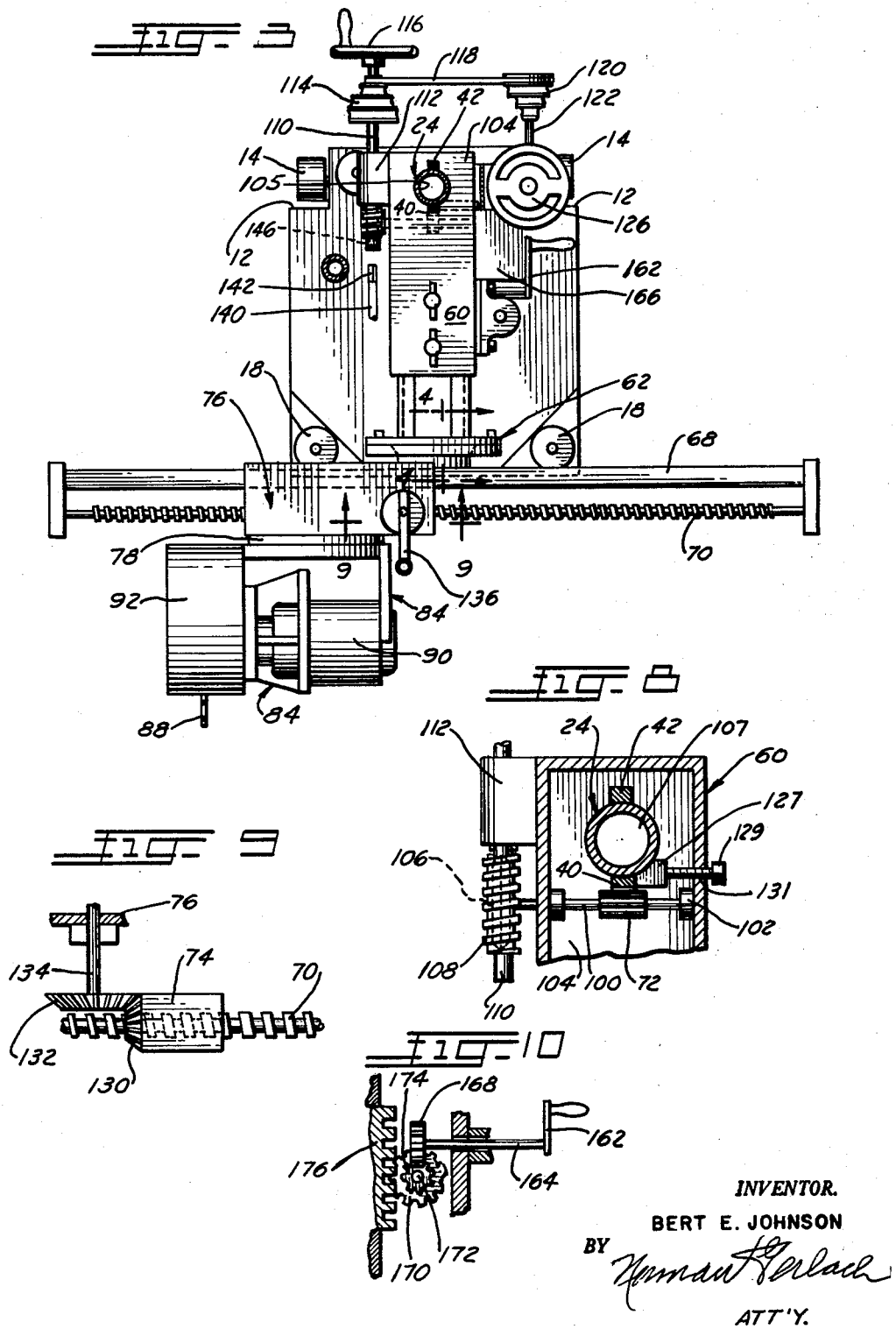

3,148,001
MOBILE POWER-ACTUATED CONCRETE SAW WITH REACTION SUPPORTING MEANS THEREFOR
Bert E. Johnson, 856 W. Agatite, Chicago 40, Ill.
Filed Mar. 26, 1962, Ser. No. 182,296
6 Claims. (Cl. 299—75)

The present invention relates to rotary power-driven saws and has particular reference to a mobile power-actuated saw of the type which is adapted to operate upon highly resistant objects, such as concrete. Still more specifically, the invention is concerned with a power-actuated saw of the type which is designed for use in operating upon a vertical surface and is mounted upon a wheeled traction support or base and in which the entire assembly, including the traction support or base, has associated therewith novel means for anchoring the same in a working position so as to absorb the reaction thrust incident to the sawing operation. The invention further contemplates such a saw assembly wherein the saw proper is capable of operating selectively in a vertical plane, a horizontal plane, or at any angle to either plane as desired.

The provision of such a saw assembly is a general object of the invention and it is a further object to provide a saw assembly wherein the rotary saw blade is operatively disposed upon a secondary carriage which, in turn, is mounted upon a primary carriage, the primary carriage being capable of movement in one direction in space and the secondary carriage being capable of movement in various selected directions with respect to the primary carriage, separate power trains being provided for driving each carriage. By such an arrangement, the primary power train may be operated to move the saw in said one direction in space, or the secondary power train may be operated to move the saw in any of said selected directions. Specifically, it is contemplated that the direction of movement of the primary carriage shall be a vertical direction for the creation of vertical kerfs or cuts in the work. It is further contemplated that the various directions of movement of the secondary carriage shall all be in a vertical plane but shall include movement in a horizontal direction and substantially all directions throughout angles of 90° on either side of such horizontal direction in the vertical plane so that the apparatus may be adjusted for travel of the saw during cutting operations in any direction whatsoever when operating a vertical surface.

As previously indicated, the power-driven saw of the present invention is essentially designed for use in operating upon a vertical surface as, for example, the side of a building or an inside wall where it is desired to cut an opening as a doorway or window through such side or wall. Heretofore, the creation of such an opening in a previously formed concrete wall has entailed an inordinate amount of work, often consuming an entire day for the cutting of a simple rectangular door opening through the wall. Ordinarily, a core drill or the like is first employed to drill through the wall a series of closely spaced holes establishing a panel which subsequently is broken out of the opening by sledge operations. To assist in the weakening process, adjacent holes in the series are chiseled into intercommunication until sufficient bonds have been broken that the panel may be forced from its position in the wall. Often, due to breakage, it is necessary to remove the door panel in sections. After the door panel has been removed to establish the opening, it is necessary to trim the jagged edges of the opening by surfacing the same, utilizing suitable grinding apparatus for this purpose, as well as grouting in all defects.

The present invention obviates much of this sort of work and, toward this end, it contemplates the provision of a compact portable sawing machine or apparatus including a machine framework having traction wheels associated therewith so that it may be rolled into position at any given scene of operations. The framework includes a vertically disposed reaction post which is adjustable in height or length so that it may be expanded between an underlying floor and an overlying ceiling to thus anchor the same firmly in position, the traction wheels being retractible to permit such anchoring of the reaction post. A primary rack, which is substantially coextensive with the reaction post and cooperates with a motor-driven pinion mounted on a primary carriage so that, as the pinion is rotated in one direction or the other, the carriage will travel upwardly or downwardly on the post. A secondary rack in the form of a worm, is swivelly mounted on the primary carriage for turning movements about a horizontal axis and this secondary rack cooperates with a motor-driven nut mounted on a secondary carriage so that, as the nut is rotated in one direction or the other, the secondary carriage may traverse the secondary rack in either direction. The secondary carriage has mounted thereon the rotary saw proper, together with an individual actuating motor for rotating the saw. Means are provided whereby the plane of the rotary saw may be varied with respect to the direction of extent of the secondary rack.

In actual practice, most sawing operations which are performed upon vertical surfaces, such as building walls, either exterior or interior, are either vertical or horizontal sawing operations and, accordingly, the secondary rack is normally positioned so that it extends horizontally and is locked or clamped in such horizontal position. Thus, by setting the saw so that the plane of the saw blade extends vertically, by setting the saw into operation, and by causing the primary carriage to travel vertically along its respective rack, a vertical kerf or cut may be produced in the wall undergoing sawing. Similarly, by setting the saw so that the plane of the saw blade extends horizontally, by setting the saw into operation, and by causing the secondary carriage to travel along the secondary and horizontally disposed rack, an horizontal kerf or cut may be produced in the wall. By inclining the secondary rack at a selected angle from a horizontal plane, by setting the saw into operation, and by causing the secondary carriage to travel along the rack, kerfs or cuts which extend at various angles with respect to a horizontal plane may be produced in the wall.

The provision of a sawing machine or apparatus of the character briefly outlined above being among the principal specific objects of the present invention, it is a further object to provide such an apparatus wherein both the primary carriage and the secondary carriage are capable of being selectively driven under the control of a single electric motor which is mounted on and movable bodily with the primary carriage, and wherein the rotary saw proper is powered by its own individual motor. In carrying out this last mentioned object of the invention, it is contemplated, as a matter of preference, that the motor which selectively drives the carriages be an electrically powered motor, while the motor which operates the saw proper be an air-operated motor.

It is another object of the invention to provide a power-driven saw of this character wherein the reaction post for assimilating reaction thrust during sawing operations is of a sectional nature so that by a judicious selection of post sections, both as to their number and lengths, different ceiling heights may be accommodated. A similar and related object of the invention is to provide such a selection of reaction post sections wherein one of such sections has associated therewith means for effecting post elongation so that a given post assembly, made up of individual sections operatively connected together, may be wedgingly interposed between a ceiling and floor structure, or between any pair of opposed supporting surfaces, to attain the necessary reaction support for the sawing operation.

The provision of a power-driven rotary saw which is extremely simple in its construction, considering the numerous functions of which it is capable of performing, and which, therefore, may be manufactured at a low cost; one which is comprised of a minimum number of parts, particularly moving parts, and which, therefore, is unlikely to get out of order; one which is rugged and durable and which, therefore, will withstand rough usage; one which is capable of ease of erection and dismantling for purposes of inspection of parts, replacement or repair thereof; one which is capable of ease of operation by a single operator without requiring any particular degree of skill; and one which, otherwise, is well adapted to perform the services required of it, are further desirable features which have been borne in mind in the production and development of the present invention.

Numerous other objects and advantages of the invention, not at this time enumerated, will become readily apparent as the following description ensues.

In the accompanying three sheets of drawings forming a part of this specification, one illustrative and preferred embodiment of the invention has been shown.

In these drawings:

FIG. 1 is a side elevational view of a rotary power drive saw constructed in accordance with the principles of the present invention;

FIG. 2 is an end elevational view of the saw shown in FIG. 1;

FIG. 3 is a sectional view taken along the line 3—3 of FIG. 2;

FIG. 4 is a sectional view taken along the line 4—4 of FIG. 3;

FIG. 5 is a sectional view taken along the line 5—5 of FIG. 1;

FIG. 6 is a sectional view taken substantially along the line 6—6 of FIG. 1;

FIG. 7 is a sectional view taken along the line 7—7 of FIG. 2;

FIG. 8 is a sectional view taken along the line 8—8 of FIG. 1;

FIG. 9 is a sectional view taken along the line 9—9 of FIG. 3;

FIG. 10 is a sectional view taken along the line 10—10 of FIG. 1; and

FIG. 11 is a sectional view taken along the line 11—11 of FIG. 1.

Referring now to the drawings in detail and in particular to FIGS. 1, 2 and 3 wherein a preferred embodiment of the invention has been shown in its entirety, the improved power driven rotary saw of the present invention involves in its general organization a base 10 which may be in the form of a casting or plate and which, as best seen in FIG. 3, is of generally rectangular design. The two corners of the base 10 at the rear end thereof are cut away as at 12 for the nesting of a pair of traction wheels 14 by means of which the saw may, when tilted slightly rearwardly to raise the forward end of the base from the supporting surface, be manually rolled from one place to another or moved to an approximate operative position at a scene of operations immediately prior to setting the saw up for operation.

A series of four elevation and leveling screws 16, having operating handles 18 associated therewith, are provided for raising the base a slight distance from the supporting surface to cause the traction wheels 14 to become raised from the supporting surface so that the base 10 and instrumentalities supported thereby may be fixedly and nontractionally supported during sawing operations.

Seated at the lower end thereof within an upwardly facing cup-shaped split retaining boss 20 and capable of being clamped therein by means of a clamping screw 22 (FIG. 11), is a composite vertical reaction post which has been designated in its entirety at 24. The reaction post 24 is of a sectional nature and is comprised of a number of individual tubular and preferably cylindrical post sections which may differ in length as desired. For illustrative purposes herein, the composite post 24 is comprised of three post sections including a relatively long lower post section 26, a relatively short upper post section 28 and a relatively short intermediate post section 30. This disclosure is made inasmuch as it is contemplated that, in the manufacture of the post sections, they shall be made in two sizes, namely, a full size section as exemplified by the section 26, and a half-size section as exemplified by both the sections 28 and 30. The purpose of making the post sections in different sizes is so that the composite post 24 may be built up section-by-section to a desired height to accommodate different floor-to-ceiling heights as will be more particularly described presently. As will also be more particularly described at the upper end of the upper post section 28, there is provided an adjustable wedge screw assembly 32 by means of which a final elongation may be imparted to the post assembly 24 to the end that it may be wedgingly secured between an overhead ceiling or other support 34 (see FIG. 1) and the supporting or foundation surface 36.

The composite post 24 has associated therewith on one side thereof an elongated toothed rack 40 and on the other side thereof a guide rail 42, the rack and rail being substantially coextensive with the post, exclusive of the wedge screw assembly. The rack 40 and rail 42 are composite in their nature, each post section including an individual rack section or segment (see FIG. 8) and an individual rail section or segment. The various sections 26, 28 and 30 are maintained in their assembled end-to-end relationship by means of inner coupling tubes 48 which are keyed to the adjacent post sections.

The previously mentioned wedge screw assembly 32 includes a threaded plug 50 (see FIG. 6) which is telescopically received in the open upper end of the post section 28 and which is keyed therein as at 52 against turning movement. The wedge screw assembly 32 further includes a threaded rod or shank 54 which is threadedly received through the plug 50 and which carries at its upper end a ceiling-engaging head 56. The head 56 is formed with a transverse bore 58 therethrough designed for reception therein of an operating tool, such as a lever (not shown), by means of which rotational movements may be applied to the threaded shank for height-adjusting purposes.

Supported on the post 24, for vertical movements therealong in opposite directions, is a primary carriage 60 which projects horizontally and overlies the base 10. The carriage 60 is of an extensible nature and carries at its distal end a swivel joint 62 including a fixed plate 64 and a rotatable plate 66, the latter plate having secured thereto an elongated cage-like frame 68 within which there extends axially a nonrotatable fixed worm 70.

The rack 40 may be regarded for purposes of discussion herein as a primary rack, while the elongated worm 70 may be regarded as being a secondary rack. The primary rack cooperates with a driven pinion 72 (see FIG. 8) by means of which vertical movements are imparted to the primary carriage 60. The secondary rack or worm 70 cooperates with a driven nut 74 (see FIG. 9) by means of which axial sliding movements along the worm are imparted to a secondary carriage 76.

A swivel joint 78, including a fixed plate 80 and a rotatable plate 82, is carried at the forward side of the carriage 76 and the plate 82 serves to support a saw frame or head 84. The saw frame 84 has mounted thereon suitable bearing supports 86 (see FIG. 1) for a rotary saw blade or saw proper 88 and a motor 90 which preferably is operated by compressed air. The motor 90 and saw 88 are operatively connected in driving relationship by means of a drive shaft 91 (see FIG. 7) and the saw is provided with a shield or hood 92 to which liquid coolant may be supplied through a line 94 and from which hood the products of abrasion may be withdrawn through a pair of suction lines 96 at the top and bottom of the hood 92, respectively. The details of the hood 92 have not been illustrated in detail herein since they form no part of the present invention. One type of hood suitable for use in connection with the present power-actuated rotary saw has been shown and described in my United States patent application Serial No. 194,812, filed on May 15, 1962 and entitled "Sludge Removal Hood and Bonnet Assembly for a Rotary Power-Driven Saw" and reference may be had to such application for a full understanding thereof. It is deemed sufficient for purposes of description herein to state that the hood, in combination with the surface of the wall undergoing sawing, provides a substantially closed traveling chamber for the saw blade 88 to which chamber the coolant is supplied and from which sludge is withdrawn with substantially no leakage or dripping of the coolant so that the apparatus may be operated in close quarters within a building without involving accumulation of the coolant under foot.

The power train by means of which the pinion 72 may be rotated in either direction to raise or lower the primary carriage 60, either continuously during sawing operations to establish a desired saw feed, or for fixed placement of the carriage while transverse or angular saw kerfs or cuts are being made, has been illustrated in FIG. 8. The pinion 72 is carried on a shaft 100 rotatably mounted in bearings 102 on the carriage casing 104. The casing 104 is formed with top and bottom openings 105 and 107 therein through which the composite post 24 projects, these openings serving to establish the sliding connection between the carriage 60 and the post. The openings 105 and 107 may best be seen in FIGS. 3 and 8, respectively. The shaft 100 projects outwardly of the casing 104 and has mounted thereon exteriorly of the casing a worm wheel 106 which meshes with a worm 108 mounted on a worm shaft 110 rotatably supported in a bearing box 112. The worm shaft 110 projects rearwardly of the carriage casing 104 and carries both a sheave cluster 114 (see FIG. 3) and a hand wheel 116 as shown in FIG. 3. The sheave cluster 114 is operatively and selectively connected by means of a belt 118 to a second and cooperating sheave cluster 120 carried on the output shaft 122 of a gear reduction device 124. The input shaft of the gear reduction device is operatively connected to an electric motor 126 suitably mounted on the carriage 60 for elevational movements bodily therewith. The pinion 72 (FIG. 8) may thus be driven either by hand, utilizing the hand wheel 116, or by means of the electric motor 126. When driving the pinion by hand, the belt 118 (see FIG. 3) may be disconnected if desired to avoid idle operation of the motor and gear reduction device.

In order to compensate for wear between the various relatively slidable parts as, for example, to nullify the effect of looseness when the openings 105 and 107 become enlarged due to wear, a slack take-up shoe 127 (see FIG. 8) bears frictionally against the post 107 and the degree of pressure exerted thereby may be varied by means of an adjusting screw 129 which is threaded through an opening 131 provided in one of the side walls of the carriage casing 104.

The power train by means of which the nut 74 may be rotated in either direction to cause traverse of the secondary carriage 76 along the rack or worm 70 has been illustrated in FIGS. 3 and 9. The nut 74 has fixedly secured thereto a bevel gear 130 which is in constant mesh with a second bevel gear 132 mounted on a shaft 134. The shaft 134 projects exteriorly of the carriage 76 and carries thereon a hand wheel 136. Turning of the hand wheel 136 in one direction or the other serves to drive the nut 74 through the medium of the two bevel gears 130 and 132 to thus cause the carriage 76 to traverse the worm 70 in the desired direction.

Means are provided whereby the carriage 76 may be driven either by hand, utilizing the hand wheel 136, or by means of the electric motor 126 previously described in connection with vertical movements of the carriage 60. Accordingly, a flexible coupling shaft 140 (see FIGS. 1 and 3) has the opposite ends thereof squared as at 142 for reception in respective square sockets 144 and 146 provided in the end of the shaft 134 and in the end of the shaft 110. When the flexible shaft 140 is operatively installed between the two shafts 134 and 110, the carriage 76 may be power-driven from the motor 126.

As previously stated, the carriage 76 is extensible so that the saw frame may be fed forwardly to increase the depth of saw cut. Accordingly, the carriage 60 is comprised of a fixed section 150 and a movable extensible section 152, the latter being telescopically related to the former. This telescopic relationship is best illustrated in FIG. 5 wherein the fixed section 150 is shown as being of rectangular box-like design with the movable section 152 being slidable within the outer fixed section. A T-slot 154 is formed in the movable section 152 and a conformably shaped clamping plate 156 is disposed within the T-slot 154 and is adapted to be clamped against the inwardly directed flanges 158 of the T-slot to draw the latter hard against the inside face of the fixed section 150. Suitable clamping screws 160 are provided for manually effecting the clamping operation. Feeding of the movable section 152 forwardly is accomplished by means of a crank arm 162 carried at the outer end of a shaft 164 (see FIGS. 1 and 10) which projects into a gear housing or cover plate 166. Within the gear housing 166, the shaft 164 carries a gear 168 which meshes with a worm 170 mounted on a worm shaft 172. A pinion 174, also mounted on the worm shaft 172, meshes with a short rack 176 (see also FIG. 5) fixedly disposed within a recess 178 provided in the movable carriage section 152. Turning movement of the crank arm 162 in one direction or the other will thus serve to impel the rack 176 forwardly or rearwardly, as the case may be, thus imparting corresponding motion to the movable carriage section 152 so that the cage-like frame 68 and saw frame 84 supported thereby may be moved forwardly or rearwardly, as required, to vary the depth of the saw cut.

The two swivel joints 62 and 78 are substantially identical in their construction and, therefore, a description of one of them will suffice for the other. As shown in FIG. 4, the swivel joint 62 includes the previously mentioned fixed plate 64 and the movable plate 66. The fixed plate 64 is carried at the outer end of the extensible section 52 of the carriage 60 and it is formed with a circular opening 180 therein for reception of a pilot lug 182 provided on a carrier 184 to which the movable plate 66 is fastened by means of screws 186. A clamping ring 188 surrounds the carrier and is adapted to be drawn thereagainst by means of a series of clamping screws 190 which pass through holes 192 formed in the fixed plate 64. By loosening the clamping screws 190 and turning the movable plate 66 and carrier 184 about the axis of the pilot lug 182, the position of the plate 66 and, consequently, the inclination of the elongated frame 68, may be adjusted after which the clamping screws 190 may be tightened to clamp the various parts in their adjusted positions. In the case of the swivel joint 78, a similar adjustment of the movable plate associated therewith will serve to establish the direction in space of the axis of rotation of the saw blade 88.

The herein described rotary saw will, of course, be provided with suitable pneumatic and electric control devices. These devices form no part of the present invention. However, for exemplary purposes, a control panel 200 is shown as being operatively supported at the upper end of a vertical post 202 which projects upwardly from the base 10.

In the operation of the herein described power-driven rotary saw, the entire saw assembly may be wheeled to a given scene of operations by tilting the same slightly rearwardly so that the traction wheels 14 are effective on the traction surface and constitute the sole supporting means for the assembly. Assuming, for purposes of discussion, that it is desired to cut a rectangular door opening in an inside concrete wall of a building, the assembly will be brought to a position of opposition to the wall by wheeling the same into such position and, thereafter, the levelling screws 18 may be operated to level the base 10 and raise the same from the supporting surface. The requisite number of post sections are selected to establish the composite reaction post 24 and are installed within the split retaining boss 20 and assembled upon one another in the manner previously described. The wedge screw assembly 32 is then manipulated by means of a suitable torque rod which is inserted in the transverse bore 58 and the ceiling-engaging head 56 is caused to bear against the ceiling 34 so as to wedge the reaction post as a whole into a fixed position between the ceiling 34 and the floor or foundation surface 36. When this wedging action is accomplished, the entire framework of the saw is secured in a fixed position against the reaction forces exerted by the saw blade 88 during sawing operations.

Prior to performing any sawing operations on the wall, the outline of the rectangular opening may be suitably inscribed on the wall, utilizing a piece of chalk, a crayon or the like. If the first cut is to be a vertical one, it may be made either by a descending or a rising saw head. Assuming that a rising saw head is to be employed, the primary carriage 60 is lowered on the post 24 to its lowermost position, the swivel joints 62 and 78 adjusted so that the plane of the saw blade 88 is vertical, and the hand wheels 116 and 136 are manipulated to bring the saw blade into register with the point of initial cut. Thereafter, the air motor 90 is set into operation and the crank arm 162 is manipulated to establish the necessary depth of cut which, in the present instance, is such that the saw blade 88 will cut completely through the wall. After an initial cut has been effected to carry the blade 88 through the wall, the motor 126 may be operated to cause the pinion 72 (see FIG. 8) to ride upwardly on the toothed rack 40 progressively. During upward movement of the primary carriage 60, the saw will operate upon the wall undergoing cutting and create therein a vertical slit which may be terminated when the saw blade 88 rises to the level where the upper transverse cut or slit is to be made in the wall.

The saw head 84 is then retracted by means of the crank arm 162 and the swivel joint 78 adjusted to bring the plane of the saw blade 88 to a horizontal position. Ordinarily, when a rectangular opening is to be cut in the wall, the swivel joint 62 will have been adjusted before the first vertical cut is made so that the axis of the elongated worm 70 extends horizontally, although a vertical cut may be made with this axis extending indiscriminately in any direction. If, after the first vertical cut has been performed, the axis of the worm 70 is not already horizontal, the swivel joint 62 will, at this time, be so adjusted as to bring the worm into a horizontal plane and the swivel joint 78 will subsequently be adjusted to bring the plane of the saw blade 88 into a horizontal plane for performance of a horizontal cut.

Commencing at the extreme upper end of the first vertical cut, the horizontally disposed saw blade 88 is fed forwardly by means of the crank arm 162 until the desired depth of the blade is attained, after which the motor 126 will be operated to drive the rotatable nut 74 and cause the same to travel along the worm 70, it being understood, of course, that the flexible coupling shaft 140 will be connected between the worm shaft 110 and the shaft 134 (see FIGS. 1 and 8) to establish the power train between the motor 126 and nut 74. The saw will then operate upon the wall undergoing cutting and will create therein a horizontal slit across the upper edge of the rectangular opening to be formed and along a previously inscribed line. The slit will be terminated at the intersection of the slit with the inscribed vertical line which represents the second vertical slit to be made. The saw head will again be retracted in the manner previously described and the swivel joint 78 again adjusted to render the plane of the saw blade 88 vertical. Utilizing the crank arm 162, the rotating saw blade will be fed forwardly to commence a second vertical cutting operation at the top of the rectangular opening to be formed and, after the proper depth has been attained, the flexible shaft 140 will be again connected between the shafts 110 and 144 and the motor 126 operated to rotate the nut 74 and cause the saw head to descend and create a vertical slit in the wall which represents the third side of the rectangular opening to be formed.

After the saw has descended to the lowermost level of the rectangular opening to be formed in the wall, sawing operations will be terminated and the apparatus adjusted for performing the final sawing operation horizontally across the bottom edge of the desired rectangular opening. The swivel joint 62, being already adjusted so that the axis of the worm 70 extends horizontally, it is merely necessary to adjust the swivel joint 78 in the manner previously described to bring the plane of the saw blade 88 into a horizontal position. The saw head may then be caused to traverse the bottom edge of the rectangular opening, after which the panel which has been created by the four sawed intersecting slits may be knocked out of its surrounding opening to complete the formation of the door or other opening. By reason of the fact that continuous sawing operations invariably create relatively sharp and even cuts through the material undergoing sawing, the production of a rectangular opening in a wall in the manner hereinbefore described leaves little or no smoothing or grouting operations to be performed and completely eliminates the necessity of conventional methods of forming door openings.

Upon completion of sawing operations, the levelling screws 16 may be manipulated to lower the base 10 and bring the traction wheels 14 into tractional rolling engagement with the floor or other foundation surface, after which the entire apparatus may be tilted rearwardly at a slight angle to place the weight of the apparatus upon the wheels so that the apparatus may be wheeled from the scene of operations.

The motor 126 is preferably of the reversible type although not necessarily so. Where a reversible motor is employed, sawing operations in either direction may be resorted to, either vertically, horizontally or at any in-between angle. Universal sawing operations at any angle for the creation of door and other openings may be accomplished even though the motor 126 be unidirectional. The swivel joints 62 and 78 are both capable of adjustment through 360° so that by turning the axis of the worm 70 end-for-end, the desired direction of travel of the saw head may readily be attained. For example, a horizontal cut may be made from left to right as viewed in FIG. 3 with the worm 70 extending horizontally. Assuming the motor 126 to be a unidirectional motor, if the worm is turned end-for-end and the motor operated, the direction of travel of the saw head will be reversed and a horizontal cut from right to left may then be effected.

The invention is not to be limited to the exact arrangement of parts shown in the accompanying drawings or described in this specification as various changes in the details of construction may be resorted to without departing from the spirit of the invention.

Therefore, only insofar as the invention has particularly been pointed out in the accompanying claims is the same to be limited.

Having thus described the invention what I claim as new and desire to secure by Letters Patent is:

1. In a rotary power-driven saw for sawing a vertical surface, in combination, a wheeled base, screw means to jack up said base and thus support the same from a foundation surface, a vertical post projecting upwardly from said base and comprised of individual post sections capable of selective telescopic assembly upon one another whereby the vertical extent of the post may be varied, screw means for varying the effective length of one of said post sections to the end that the post and base as a whole may be wedged in fixed position between said foundation surface and an overhead support, a rack segment on each post section, the various rack segments being disposed in vertical end-to-end alignment and cooperating with one another to provide an elongated vertical rack substantially coextensive with the post, a primary carriage slidable vertically on said post, a pinion on said carriage in constant mesh with said rack, a motor on said carriage, a power train operatively coupling said motor and pinion in driving relationship, a second elongated rack mounted for rotation on said primary carriage about a horizontal axis, means for clamping said second rack in any selected position of angular adjustment with respect to the primary carriage, a secondary carriage slidably disposed on said second rack for movements therealong in opposite directions, a saw head mounted on said secondary carriage for rotation about an axis parallel to said horizontal axis, said saw head including a circular rotary saw blade, means for clamping said saw head in any selected position of angular adjustment with respect to the secondary carriage, a motor mounted on and supported by said saw head, and means operatively connecting said last mentioned motor and saw blade in driving relationship.

2. In a rotary power-driven saw, the combination set forth in claim 1 and wherein said primary carriage includes an extensible section movable horizontally in a fore-and-aft direction, the second elongated rack being mounted on said extensible section and movable bodily therewith, and means for moving said extensible section.

3. In a rotary power-driven saw for sawing a vertical surface, in combination, a wheeled base, screw means to jack up said base and thus support the same from a foundation surface, a vertical post projecting upwardly from said base, screw means for varying the effective length of said post to the end that the post and base as a whole may be wedged in fixed position between said foundation surface and an overhead support, an elongated rack substantially coextensive with said post, a primary carriage slidable vertically on said post, a pinion on said carriage in constant mesh with said rack, a motor on said carriage, a power train operatively coupling said motor and pinion in driving relationship, a second elongated rack mounted for rotation on said primary carriage about a horizontal axis, means for clamping said second rack in any selected position of angular adjustment with respect to the primary carriage, a secondary carriage slidably disposed on said second rack for movements therealong in opposite directions, a saw head mounted on said secondary carriage for rotation about an axis parallel to said horizontal axis, said saw head including a circular rotary saw blade, means for clamping said saw head in any selected position of angular adjustment with respect to the secondary carriage, a motor mounted on and supported by said saw head, and means operatively connecting said last mentioned motor and saw blade in driving relationship.

4. In a rotary power-driven saw, the combination set forth in claim 3 and wherein said primary carriage includes an extensible section movable horizontally in a fore-and-aft direction, the second elongated rack being mounted on said extensible section and movable bodily therewith, and means for moving said extensible section.

5. In a rotary power-driven saw for sawing a vertical surface to cut a rectangular opening therein, in combination, a base, a vertical post projecting upwardly from said base, means for varying the effective length of said post to the end that the post and base as a whole may be wedged in fixed position between a foundation surface and an overhead support, a primary carriage slidable vertically on said post, traction means on said primary carriage for effecting sliding movement of the carriage on said post, said primary carriage including an extensible and retractible carriage section movable toward and away from said vertical surface in a direction normal to the latter, an elongated rack pivoted medially of its ends to said carriage section for end-over-end swinging movements about a horizontal axis and parallel to said vertical surface, means for clamping said rack in any desired position of angular adjustment with respect to said carriage section, a secondary carriage mounted for sliding movement axially on and along said rack, means for effecting sliding movements of the secondary carriage, a saw head mounted on said secondary carriage for rotation about a horizontal axis extending at a right angle to said rack, said saw head including a circular rotary saw blade, means for selectively clamping said saw head in position on the secondary carriage so that the plane of said saw blade may be varied, a reversible electric motor on said primary carriage and operatively connected to said traction driving means, and a motor on said saw head for rotating said saw blade.

6. In a rotary power-driven saw for operating upon a vertical surface to create linear cuts therein at any angle with respect to a horizontal plane, a base, a vertical post projecting upwardly from said base, means for varying the effective length of said post to the end that the post and base as a whole may be wedged in fixed position between a foundation surface and an overhead support, a toothed rack on said post and substantially coextensive therewith, a primary carriage slidable vertically on said post in opposite directions, a traction pinion on said carriage, a drive shaft rotatably mounted on said carriage, a power train operatively connecting the drive shaft and pinion in driving relationship, said carriage including a normally fixed carriage section and an extensible and retractible carriage section movable toward and away from said vertical surface in a direction normal to the latter, means for clamping said extensible and retractible carriage section in any selected position of adjustment, an elongated worm mounted for pivotal swinging movements on said extensible and retractible carriage section in a plane parallel to said vertical surface and about an axis normal thereto, means preventing rotation of said worm about its longitudinal axis, means for clamping said worm in any selected position of angular adjustment, a secondary carriage slidably disposed on said extensible and retractible carriage section for movements conformable to the direction of extent of said worm, a rotatable nut threadedly received on said worm, a drive shaft on said secondary carriage, a power train operatively connecting said latter drive shaft and rotatable nut in driving relationship, a saw head mounted on said secondary carriage for angular adjustment about an axis normal to said vertical surface and parallel to the axis of swinging movements of the worm, said saw head including a circular saw blade mounted for rotation about an axis parallel to said vertical surface, and means mounted on and supported by the saw head for driving said saw blade.

References Cited in the file of this patent

UNITED STATES PATENTS 2,965,094    Carrier _____ Dec. 20, 1960

FOREIGN PATENTS 383,901     Germany _____ Nov. 2, 1923
219,960     Australia _____ May 15, 1958